8234X
J. D. EMES.
THRESHING SMALL GRAIN.
Patented June 4, 1834.
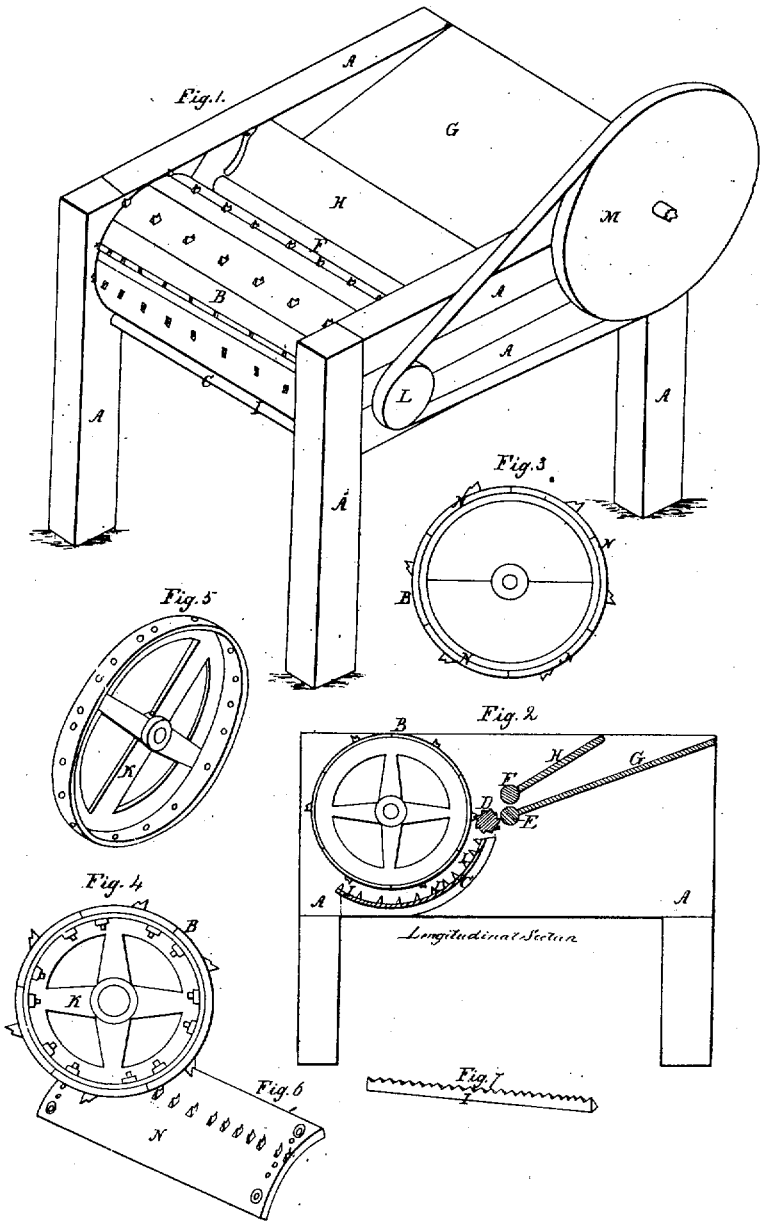
THE NORRIS PETERS CO., PHOTO-LITHO., WASHINGTON, D. C.

June 4. 1834 433

8234X

James D. Emes.

Letters Patent

The Schedule referred to in these Letters Patent and making part of the same, containing a description in the words of the said James Dyer Emes himself of his improvement in the Machine for threshing all kinds of small grain Rice, and seeds.

To all to whom these presents shall come.

Be it known that James Dyer Emes of Lansingburg in the County of Renslear, in the State of New York, have invented a new and useful improvement in threshing all kinds of small grain, Rice and seeds, and that the following is a full and exact description of the construction and operation of the said invention (or Machine) as invented or improved by me. This Machine is constructed by a frame, the supporting side pieces of which are about ten inches wide and three inches thick and a corresponding frame of strength sufficient to firmly support the Machinery to be attached, graduated by the size and length of the cylinder, the best proportion of which (the cylinder) is twenty two inches long and in diameter thirteen inches, but may vary (to produce a good effect) from one foot to three in length, the diameter to be governed & graduated by the length never running above two feet nor sinking below six inches. The Cylinder is formed of cast iron, having three heads cast and turned to a perfect circle, these heads having a broad flange from one to two inches wide and about three eighths of an inch thick. Through which, holes should be drilled or cleats cast to admit a bolt from three eighths to half an inch in diameter, with a square or round head counter sunk in the bands of the covering or laying of the cylinder, a fine screw being cut on each bolt to receive a strong nut, sufficient to hold the covering or lags of the cylinder which are cast iron, also. The holes in the flange of each head twelve in number making

8234X making in all (if the cylinder is formed with three heads) (which is best) thirty six or if with two heads, twenty four; the heads which will be about ten inches in diameter should be set, the two end heads (if three are used) about three quarters of an inch in from the end of the cast iron lagging, which should be about three sixteenths of an inch thick with straps or bands one and a half inch wide, and half inch thick to admit the bolt head five eighths of an inch square or round, and the third head placed in the centre, if two heads only are used, they they should be placed upon the cylinder shaft six inches in from the end of the lagging or covering of the cylinder, leaving about ten inches space on the inside between the heads, the straps or bands of the cast iron laging should in all cases correspond with the heads to which they are to be attached and to prevent the straw and grain from getting into the cylinder when in motion a wooden head about three quarters of an inch thick is to be neatly fitted in flush with the ends of the laging and confined to them on the shaft by four wood screws in each, entered through holes drilled in the laging to receive them.— The holes to receive the bolt in the flange of the heads may be tapped after drilling and a screw cut therein to answer in lieu of a nut, but bolts and screws having heavy nuts, on the under side and drawing the laging firmly to the head is best.— The covering or lags of the cylinder are divided into six equal parts coming together with locked or bevel joints the edges
9 pushing each other from one quarter to half an inch, having a projection from the laging for a bevel Beater and forming the outer surface and cast solid with it, three quarters of an inch raise more or less and about three quarters of an inch wide at the base having a brace one quarter of an inch the surface of which beater is grooved ~~one~~ one quarter or half inch deep leaving opposing mitre edges.— the first edge being lower about one fourth of an inch or one eighth of an inch (in proportion to the diameter of the cylinder) than the back or following edge of each Beater.— notches being cast or filed diagonally across the Beater beginning at or near the centre of the length of the cylinder so as to spread the straw from the centre nearly to the ends and return —

8234 X.

return it again toward the centre by its progress in the operating of
threshing under the cylinder producing the effect of completely hul-
ling and brutting the grain. — The different ways in which this
beater may be used is thus described, to secure the same operation
it may be placed square across, lengthwise of the cylinder in the centre
of each laging or nearly back to its joint, and being so may have;
holding the same bevelled surface, points of beater running diagonally
from each extreme end of the cylinder to the centre; on the surface, or from
one to two inches from each end to the centre or bevelled from each end
running in about two inches having a straight bar in front or running
one or two inches more or less from the ends of the cylinder then
running in a spiral form round on the laging and Vice Versa —
Each arrangement being confined to an equal division on the
surface of the cylinder — or the cylinder may be cast in bands
of equal divisions, and firmly jointed together by bevelled, locked
or square joints. — The cylinder when completed should rest on fric-
tion rollers, and be suspended over a concave for all kinds of grain,
and seed excepting flax and broom corn. then a convex is better. —
The cylinder when applied to any power should be so geared as to
give from fourteen to twenty hundred revolutions per minute, and
set from one quarter to three quarters of an inch from the surface
of the concave — The concave is formed first of a single cast or
wrought iron roller, from one and a half to two inches in diameter,
with grooves bevelled to the centre on one side and cut square on the
other — so that in every turn of it there shall be opposed to the sur-
face of the cylinder a mitre edge with a spiral surface, also cut
bevelling on one side and square on the other, and contra ways to
accomodate the progress of the straw which should be a motion of
about, one to five or six of the running surface of the cylinder. This
roller is followed to form, continue, and finish, the concave by slats
or bars of wrought or cast iron, made or cast singly or in divisions, or
framed or screwed in or otherwise firmly attached to the frame
of the Machine, the edges of which should be about three sixteenths
of an

8234X of an inch or one fourth of an inch from the surface of the roller descri=
bed and from each following edge of the slats or bars of the concave,
and should be continued with a sufficient throat or opening to dis=
charge the threshed straw, throwing up a slow or gradual ascent after
it leaves the outer plane surface of the cylinder, these slats or bars are
formed of iron cast or wrought about one inch deep and three fourths
of an inch wide the surface of each slat or bar being thus made from
the first edge to the following a bevel groove should be cut leaving
the next mitre edge at least three eights of an inch deep across which
should be cut or cast contra diagonal Notches, the object of which
is to thrash the under side of the straw as turned and operated upon
by the Motion and surface of the cylinder above it the straw is fed to
the cylinder by means of a hopper or pitch board having directly
between it and running free one or two rollers from three to four inches
in diameter, set on the same base line of the centre of the commencement
of the concave and driven by leather belts from a sheave or wheel on
the end of the cylinder shaft. and like sheaves or wheels on the end of each
roller, or from the shaft of the driving wheel.— The Driving wheel
should be about four or five feet in diameter and four inches wide
when attached to a portable horse gearing, directly over the lower feeding
roller, above described is placed a pitch board hanging upon a point
hinge or swivel to which is attached a free roller moved by nothing but
the progress of the straw or unthrashed grain and held upon it by spring
sunk in the side pieces of the hopper or feeding box or by spiral springs
on the upper side. The cylinder shaft should be made of close
strong wrought iron at least one and a half inch square or round
the bearings of which should be turned perfectly round and smooth
to admit friction bushes seven eighths to one and a half inch to
encircle the arbor of the cylinder shaft, which may be made of cast iron
with flanges projecting out from the outside of the case two or three
inches and half an inch thick through which holes should be drilled
to admit bolts to keep the box steady when rising from its stationary
position produced by the motion of the cylinder, but the shaft of the
cylinder cylinder on the end outside the frame and on the same side with the dri=
ving wheel, should be placed a shieve or wheel about six inches in
diameter and wide enough to receive a flat leather strap or belt three or
four inches wide connected with the driving wheel.—

What is claimed in this improvement is the cast iron cylinder with its
twilled Beaters, as described above securing the operation of separating
the straw in a shifting position, when under the operation of thrashing;
also the concave commencing with the Roller described, which may or
may not be dispensed with— and the slats or bars as described to con=
tinue and finish the concave, and also the feeding motion so far as the
two rollers are concerned; together with the free roller in the Pitchboard

Witnesses
Edward S. Cugle
David Delance
M. H. Kidder

James D. Emery

Exd
[illegible]

Drawing (1807 words)